United States Patent
Hong et al.

(10) Patent No.: US 9,539,523 B2
(45) Date of Patent: Jan. 10, 2017

(54) INTEGRATED WASTE CATALYST CLEANING APPARATUS FOR RHDS AND VRDS PROCESSES AND METHOD THEREOF

(71) Applicant: KC Cottrell Co., Ltd., Seoul (KR)

(72) Inventors: Jeong Hee Hong, Seoul (KR); Gwan GU Yun, Gyeonggi-do (KR); Chang Hee Lee, Seoul (KR)

(73) Assignee: KC COTTRELL CO., LTD., Seoul (KR)

( * ) Notice: Subject to any disclaimer, the term of this patent is extended or adjusted under 35 U.S.C. 154(b) by 0 days.

(21) Appl. No.: 14/827,263

(22) Filed: Aug. 14, 2015

(65) Prior Publication Data

US 2016/0279681 A1    Sep. 29, 2016

(30) Foreign Application Priority Data

Mar. 27, 2015 (KR) .................. 10-2015-0043458

(51) Int. Cl.
| | | |
|---|---|---|
| B08B 3/00 | (2006.01) | |
| B01D 5/00 | (2006.01) | |
| B01D 53/96 | (2006.01) | |
| C11D 11/00 | (2006.01) | |

(52) U.S. Cl.
CPC ............. B01D 5/0072 (2013.01); B01D 53/96 (2013.01); C11D 11/0041 (2013.01)

(58) Field of Classification Search
None
See application file for complete search history.

(56) References Cited

U.S. PATENT DOCUMENTS

| | | | | | |
|---|---|---|---|---|---|
| 4,422,960 | A | * | 12/1983 | Shiroto | .................... B01J 23/85 502/206 |
| 5,685,957 | A | * | 11/1997 | Rivetti | .................. C07C 68/005 159/47.1 |
| 2013/0131407 | A1 | * | 5/2013 | Fraga | ....................... B01J 31/10 585/14 |

FOREIGN PATENT DOCUMENTS

| | | |
|---|---|---|
| KR | 10-2012-0124048 A | 3/2013 |
| KR | 10-2013-0026431 A | 3/2013 |
| KR | 10-1434437 B1 | 8/2014 |

* cited by examiner

*Primary Examiner* — Eric Golightly
(74) *Attorney, Agent, or Firm* — The PL Law Group, PLLC

(57) ABSTRACT

An integrated waste catalyst cleaning apparatus includes a reaction unit, an organic solvent unit, an organic acid unit, a drying unit, a condensation unit, a heating band, and control valves formed at transfer paths. The waste catalyst is injected into the reactor. The organic solvent stored in the organic solvent unit is to first-clean the waste catalyst. The organic solvent is discharged after cleaning. The waste catalyst is dehydrated and dried by the drying unit. The organic acid stored in the organic acid unit is to second-clean the waste catalyst. The organic acid is discharged after cleaning. The waste catalyst is dehydrated and dried by the drying unit.

8 Claims, 2 Drawing Sheets

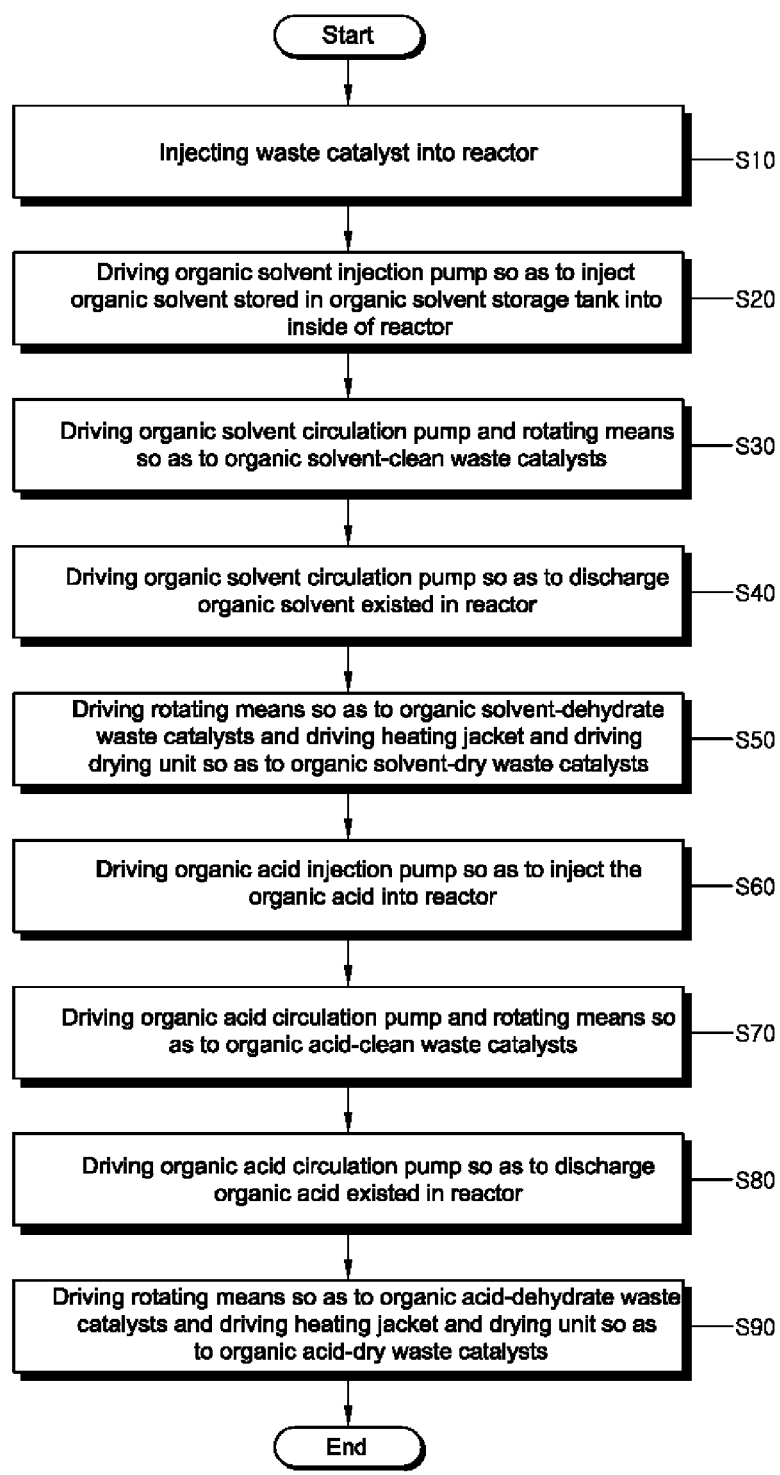

INTEGRATED WASTE CATALYST CLEANING APPARATUS FOR RHDS AND VRDS PROCESSES AND METHOD THEREOF

BACKGROUND

1. Field of the Invention

The present invention relates to an integrated waste catalyst cleaning apparatus for residual hydro desulfurization (RHDS) and vacuum residue desulfurization (VRDS) processes and a method thereof, and more particularly, to an integrated waste catalyst cleaning apparatus for residual hydro desulfurization (RHDS) and vacuum residue desulfurization (VRDS) processes and a method thereof in that a desulfurization waste catalyst produced in the residual hydro desulfurization (RHDS) and vacuum residue desulfurization (VRDS) processes can be organic solvent-cleaned and organic acid-cleaned in one reactor.

2. Description of the Related Art

According to the notice on the use of clean fuels, the sulfur content contained in the heavy oil has been gradually decreasing. In addition, the use area of the low-sulfur heavy fuel oil has been gradually expanded. Since the heavy oil such as a bunker C oil has a high sulfur content, the consumption thereof is rapidly reduced, while the consumption of light oil products has increased significantly.

Most domestic refineries have introduced heavy oil cracking and desulfurization facilities so as to cope with the light oil trend of the oil supply and demand structure and the low-sulfurization trend of the oil products. The main process for upgrading of the Heavy oil includes an Atmospheric Residue Hydro DeSulfurization (AR-HDS), a Vacuum Residue Hydro DeSulfurization (VR-HDS), a Residue Fluid Catalytic Cracking (R-FCC), and a VGO hydrotreating process (VGO-HC) and the like. Here, it should remove large amounts of sulfur and heavy metals contained in the heavy oil for a smooth operation of the process.

The hydrodesulfurization catalyst used commercially herein is a Ni—Mo/$Al_2O_3$, a Co—Mo/$Al_2O_3$ and the like. At this time, the catalyst is poisoned owing to the deposition of the sulfur and the heavy metal etc. and the life thereof come to an end. Generally, the waste catalyst is replaced with a new catalyst in one cycle or two cycle each year. The waste catalyst amount is approximately 23,000 tons per year and the new catalysts rely on imports from abroad.

In the meantime, since the catalyst self-components metals (Ni, Mo, Co, W) in addition to V, Ni and Fe and the like contained in the oil are deposited on the produced waste catalyst, it contains a considerable amount of valuable metals. The part thereof is treated through a water leaching after a soda foasting, which is most widely used method, by means of the recovery enterprise. However, there are problems in that a lot of energies is consumed owing to the hot-melt (600 to 1000° C.) and the rear end is blocked owing to the discharge of dust etc. according to the wear between the waste catalysts. Also, in case of the collection according to the water leaching, the vanadium, which is the largest content in the valuable metals, is collected and then, the molybdenum and the nickel are collected to be discarded. However, there is a problem of environmental pollution during the waste landfill owing to a burden of the disposal costs and the difficulty of a complete recovery thereof. In addition, a part of the waste catalysts is roasted and then, it exports to China etc. Accordingly, the valuable metals such as the vanadium and the molybdenum and so on, which are natural resources, have gone abroad.

The domestic refinery hydro desulfurization (HDS) process is run for a long time. However, it takes an interest in only the collection of the valuable metals, while it does not care about the process of clearing the waste catalysts. Accordingly, the domestic technical standard is below the restoration level of the waste catalysts from the key technologies to the engineering technologies.

Korea Patent Publication No. 10-2013-0026431 (publication date: Mar. 3, 2013) relates to a method for recovering catalytic metals from the residue of the refined oil and is characterized in that the residue of the refined heavy oil is pyrolyzed and combusted in a high temperature of 900° C. for the production of the ash. However, where the residue is pyrolyzed in a high temperature through the above technique, since a gamma-alumina material used as the carrier of the catalyst is changed to a beta-alumina phase and a sintering phenomenon etc. is generated in the transition metal materials such as a Ni—Mo or a Co—Mo etc., there is a limit in that only the valuable metals are collected without the reusing it.

Also, Korea Patent registration No. 10-1434437 (Registration Date: Aug. 20, 2014) filed and registered by the present applicant relates to a reproduction system of the desulfurization waste catalyst in residual hydro-desulfurization (RHDS) and vacuum residue hydro-desulfurization (VRHDS) processes. In the waste catalyst recovery system implemented by the above technology, since each step processed in a cleaning tank, a drying tank, and a collecting tank is conducted in the different devices, there are problems in that the installation expenses is increased and the working is inconvenient.

SUMMARY

Accordingly, the present invention has been made to solve the above-mentioned problems occurring in the prior art, and a object of the present invention is to provide an integrated waste catalyst cleaning apparatus for residual hydro desulfurization (RHDS) and vacuum residue desulfurization (VRDS) processes and a method thereof capable of cleaning a desulfurization waste catalyst produced in the residual hydro desulfurization (RHDS) and vacuum residue desulfurization (VRDS) processes.

Another object of the present invention is to provide an integrated waste catalyst cleaning apparatus for residual hydro desulfurization (RHDS) and vacuum residue desulfurization (VRDS) processes and a method thereof in that an organic solvent-cleaning and an organic acid-cleaning can be performed in one reaction unit, so that it can reduce the costs for installation.

According to an aspect of the invention to achieve the object described above, there is provided an integrated waste catalyst cleaning apparatus for residual hydro desulfurization and vacuum residue desulfurization processes including: a reaction unit comprising a reactor for injecting waste catalysts used in the residual hydro desulfurization and vacuum residue desulfurization processes, a rotating means for rotating the waste catalysts injected into the reactor and formed inside the reactor, and a heating jacket for wrapping an outside surface of the reactor and applying a heat thereto; an organic solvent unit comprising an organic solvent storage tank for storing an organic solvent therein and an organic solvent injection pump for injecting the organic solvent stored in the organic solvent storage tank into the reactor through a pumping; an organic acid unit comprising an organic acid storage tank for storing an organic acid therein and an organic acid injection pump for injecting the organic acid stored in the organic acid storage tank into the reactor through a pumping; a drying unit for applying a hot air to the reactor so as to dry the waste catalysts; and a condensation unit for condensing an organic solvent steam produced in the reactor so as to pick up the organic solvent.

Preferably, the integrated waste catalyst cleaning apparatus further includes: a first filter for filtering a waste catalyst byproduct of the organic solvent between the organic solvent storage tank and the reactor; and a second filter for filtering a waste catalyst byproduct of the organic acid between the organic acid storage tank and the reactor.

Preferably, the organic solvent unit further comprises an organic solvent circulation pump for circulating the organic solvent injected into the reaction unit between the reaction unit and the filter unit and the organic acid unit further comprises an organic acid circulation pump for circulating the organic acid injected into the reaction unit between the reaction unit and the filter unit.

Preferably, the condensing unit further includes a heating band for preventing the organic solvent steam from being condensed owing to an outside temperature when the organic solvent steam produced in the reaction unit is delivered to the condensation unit.

According to another aspect of the invention to achieve the object described above, there is provided an integrated cleaning method using the integrated waste catalyst cleaning apparatus for residual hydro desulfurization and vacuum residue desulfurization processes including steps of: injecting the waste catalyst into the reactor; driving the organic solvent injection pump so as to inject the organic solvent stored in the organic solvent storage tank into the inside of the reactor; driving the organic solvent circulation pump so as to circulate the organic solvent injected into the reactor between the reactor and the filter unit and driving the rotating means so as to rotate the waste catalysts inside the reactor, thereby cleaning the waste catalysts through the organic solvent inside the reactor; driving the organic solvent circulation pump so as to discharge the organic solvent existed in the inside of the reactor; driving the rotating means so as to organic solvent-dehydrate the waste catalysts inside the reactor and driving the heating jacket for wrapping the outside surface of the reactor and the drying unit for injecting the hot air into the reactor so as to organic solvent-dry the waste catalysts inside the reactor; driving the organic acid injection pump so as to inject the organic acid stored in the organic acid tank into the inside of the reactor 11; driving the heating jacket so as to maintain the internal temperature of the reactor at 40~50° C., driving the organic acid circulation pump so as to circulate the organic acid injected into the reactor between the reactor and the filter unit, and driving the rotating means so as to rotate the waste catalysts inside the reactor, thereby cleaning the waste catalysts through the organic acid inside the reactor; driving the organic acid circulation pump so as to discharge the organic acid existed in the inside of the reactor; and driving the rotating means so as to organic acid-dehydrate the waste catalysts inside the reactor and driving the heating jacket and the drying unit so as to organic acid-dry the waste catalysts inside the reactor.

BRIEF DESCRIPTION OF THE DRAWINGS

The above and other objects, features and advantages of the present invention will be more apparent from the following detailed description taken in conjunction with the accompanying drawings, in which:

FIG. 2 is a flow chart showing an integrated waste catalyst cleaning method for residual hydro desulfurization and vacuum residue desulfurization processes.

DETAILED DESCRIPTION

Figure 1:
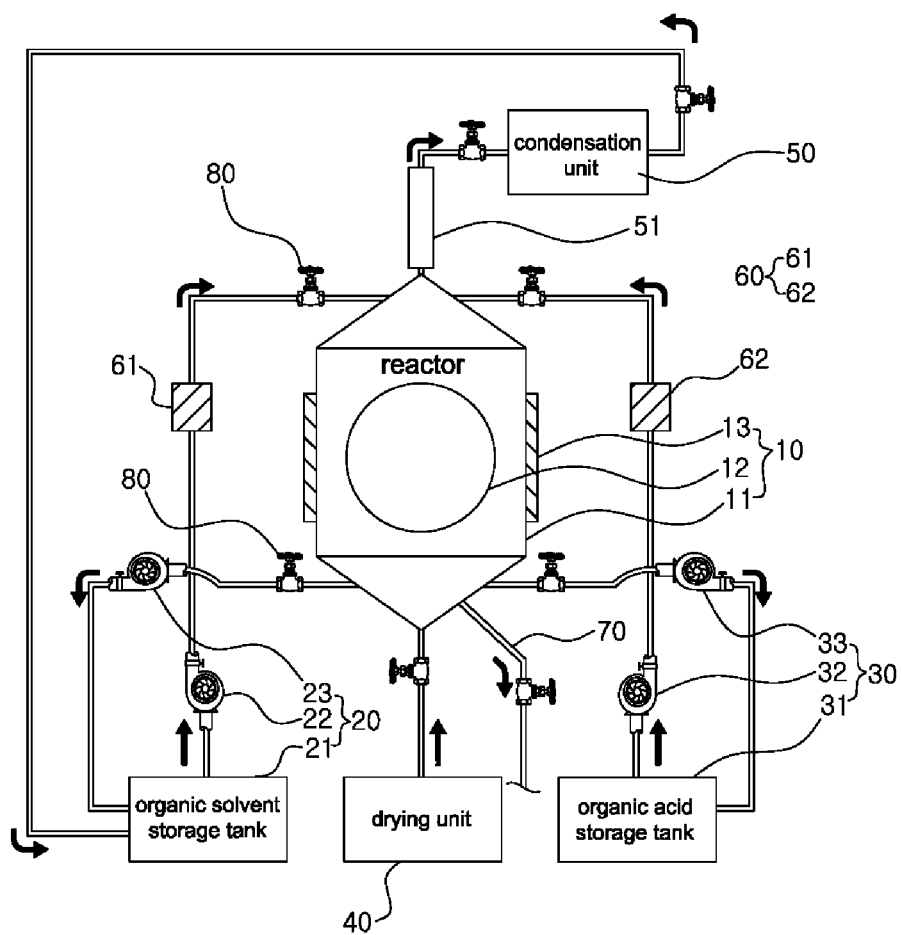
FIG. 1 is a block diagram showing an integrated waste catalyst cleaning apparatus for residual hydro desulfurization and vacuum residue desulfurization processes according to the present invention.

Hereinafter, a preferred embodiment of the invention will be described in detail with reference to the accompanying drawings.

FIG. 1 is a block diagram showing an integrated waste catalyst cleaning apparatus for residual hydro desulfurization and vacuum residue desulfurization processes according to the present invention.

According to the present invention, the oil and the vanadium component etc. can be removed from the desulfurization waste catalyst produced in the residual hydro desulfurization (RHDS) and vacuum residue desulfurization (VRDS) processes in one reaction unit 10.

The integrated waste catalyst cleaning apparatus for residual hydro desulfurization (RHDS) and vacuum residue desulfurization (VRDS) processes according to the present invention includes a reaction unit 10, an organic solvent unit 20, an organic acid unit 30, a drying unit 40, and a condensation unit 50 for condensing an organic solvent steam produced in the reactor 11 so as to pick up the organic solvent. The integrated waste catalyst cleaning apparatus according to the present invention further includes a filter unit 60 for filtering a waste catalyst byproduct from the organic solvent and the organic acid injected into the reactor 11 and used in the cleaning of the waste catalysts. The filter unit 60 can include a first filter 61 for filtering the waste catalyst byproduct from the organic solvent and a second filter 62 for filtering a waste catalyst byproduct from the organic acid. According to the present invention, the organic solvent and/or the organic acid injected by an organic solvent injection pump 22 and/or an organic acid injection pump 32 for injecting the organic acid stored in the organic acid storage tank 31 serves to clean the waste catalysts inside the reactor 11. Also, the organic solvent and/or the organic acid are circulated by means of the organic solvent circulation pump 23 and/or the organic acid circulation pump 33, so that they can be reused in the cleaning of the waste catalysts inside the reactor 11 in a state that it is filtered by the filter unit 60.

According to the present invention, it is provided with control valves 80 formed at transfer paths for connecting the reaction unit 10, the organic solvent unit 20, the organic acid unit 30, the drying unit 40, and the condensation unit 50 etc. thereto. Each control valve 80 is operated by a control panel (not shown), so that it is possible to control the injection and the discharge of the organic solvent and/or the organic acid.

The reaction unit 10 includes a reactor 11 for injecting the waste catalysts used in the residual hydro desulfurization and vacuum residue desulfurization processes in a state that it is contained in a mesh net, a rotating means 12 for rotating the waste catalysts injected into the reactor 11, provided inside the reactor 11, and formed by a punching so as to pass the organic solvent and/or the organic acid injected into the reactor 11 therethrough, and a heating jacket 13 for wrapping an outside surface of the reactor 11 and applying a heat. According to the present invention, the integrated waste catalyst cleaning apparatus can clean the organic solvent and the organic acid in one reaction unit 10, so that it can reduce the costs for installation, thereby having an economic advantage.

According to the present invention, the reactor 11 is provided with an injection hole (not shown), so that the waste catalysts are injected through the injection hole and it can check the inside thereof. According to the present invention, in a state that the waste catalysts are injected into the reactor 11 through the injection hole while being contained in the mesh net, the organic solvent and the organic acid introduced from the organic solvent storage tank 21 and/or the organic acid storage tank 31 are injected therein and the rotating means 12 and an organic solvent circulation pump 23 and/or an organic acid circulation pump 33 are driven, so that the oil contained in the waste catalysts is cleaned and then, discharged, thereby performing the cleaning of the waste catalysts. The cleaning of the organic solvent and the organic acid may be performed repeatedly.

According to the present invention, the heating jacket 13 controls the temperature by the administrator, so that the heat applies to the interior of the reactor 11. During the organic solvent cleaning, it serves to dry the waste catalyst, thereby making the organic solvent into a steam. Also, during the organic acid cleaning, it is used to promote the reaction of the organic acid and the waste catalyst.

The organic solvent unit 20 includes an organic solvent storage tank 21 for storing the organic solvent, and an organic solvent injection pump 22 for injecting the organic solvent stored in the organic solvent storage tank 21 into the reactor 11 through a pumping, and an organic solvent circulation pump 23 for circulating the organic solvent injected into the reaction unit 10 between the reaction unit 10 and the filter unit 60.

In the present invention, the organic solvent storage tank 21 was represented by a single unit. However, if necessary, it can further include an used organic solvent storage tank (not shown) for storing the organic solvent used in the cleaning of the waste catalyst. Also, if necessary, the used organic solvent storage tank is connected to the organic solvent storage tank 21, so that it can be reused in the cleaning of the waste catalyst. At this time, the storage capacity of the used organic solvent storage tank can be larger that of the organic solvent storage tank 21.

The organic solvent injection pump 22 and the organic solvent circulation pump 23 serves to pump the organic solvent stored in the organic solvent storage tank 21 to be injected into the reactor 11 and circulate the organic solvent injected into the reactor 11 between the reactor 11 and the filter unit 60 respectively. Preferably, it may be an explosion-proof material due to the characteristic of the organic solvent used as the fuel as described above.

According to the present invention, in a state that the organic solvent stored in the organic solvent storage tank 21 is injected into the reactor 11 by the organic solvent injection pump 22, the rotation means 12 provided in the inside of the reactor and the organic solvent circulation pump 23 are driven, so that the waste catalyst is cleaned inside the reactor 11 and the organic solvent used in the cleaning of the waste catalyst is filtered through the filter unit 60 and injected into the reactor 11 to be reused.

The organic acid unit 30 includes an organic acid storage tank 31 for storing the organic acid, an organic acid injection pump 32 for injecting the organic acid stored in the organic acid storage tank 31 into the reactor 11 through a pumping, and an organic acid circulation pump 33 for circulating the organic acid injected into the reaction unit 10 between the reaction unit 10 and the filter unit 60.

According to the present invention, the organic acid stored in the acid storage tank 31 is a generic name of an organic compound having the acidity. It may be an acetic acid, a butyric acid, a palmitic acid, an oxalic acid and/or a tartaric acid and the like.

In the present invention, it is used to extract the vanadium solution through the chemical reaction with the catalyst.

According to the present invention, when the organic acid is used in the cleaning of the waste catalyst, the gas is generated by the chemical reaction of the acid with the waste catalyst and discharged through the roasting furnace 70 to be gas-treated.

The organic acid injection pump 32 and the organic acid circulation pump 33 serve to pump the organic acid stored in the organic acid storage tank 21 to be injected into the reactor 11 and circulate the organic acid injected into the reactor 11 between the reactor 11 and the filter unit 60 respectively. Preferably, it may be a chemical pump due to the characteristic of the organic acid injected at a temperature of 40~50° C.

According to the present invention, in a state that the organic acid stored in the organic acid storage tank 31 is injected into the reactor 11 at a temperature of 40~50° C. by the organic acid injection pump 32, the rotation means 12 provided in the inside of the reactor 11 and the organic acid circulation pump 33 are driven, so that the waste catalyst is cleaned inside the reactor 11 through the chemical reaction and the organic acid used in the cleaning of the waste catalyst is filtered through the filter unit 60 and injected into the reactor 11 to be reused. At this time, the generated acid gas is discharged through the roasting furnace 70 to be gas-treated as described above.

The drying unit 40 serves to apply a hot air to the reactor 11 so as to dry the waste catalysts.

According to the present invention, the drying unit 40 serves to prevent the organic solvent injected into the reactor 11 during the cleaning of the waste catalyst from being condensed or promote the reaction of the organic acid with the waste catalyst.

The condensation unit 50 serves to condense the organic solvent steam produced in the reactor 11 below a temperature of 0° C. and then, pick up the organic solvent. The condensing unit 50 can include a heating band 51 for preventing the organic solvent steam from being condensed owing to an outside temperature when the organic solvent steam is delivered from the reactor 11 to the condensation unit 50.

According to the present invention, the heating band 51 can wrap the transfer path of transferring the organic solvent steam from the reactor 11 to the condensation unit 50. As needed, it can be driven at a temperature of 0~120° C. Preferably, it can be driven at a temperature of 90~100° C.

FIG. 2 is a flow chart showing an integrated waste catalyst cleaning method for residual hydro desulfurization and vacuum residue desulfurization processes. Referring to FIG. 2, the integrated waste catalyst cleaning method for residual hydro desulfurization (RHDS) and vacuum residue desulfurization processes (VRDS) can include nine steps. If necessary, it can further include a condensation unit driving step of driving the condensation unit 50 so as to condense and reuse the organic solvent steam generated during the drying of the organic solvent and a gas treating step of treating the organic acid gas generated during the drying of the organic acid so as to discharge the organic acid to the roasting furnace 70.

According to the present invention, the waste catalyst is injected into the reactor 11 through the injection hole (not shown) in a state that the waste catalyst having the oil and the inactive materials absorbed in the residual hydro desulfurization (RHDS) and vacuum residue desulfurization (VRDS) processes is contained in the mesh net (S10).

Thereafter, it drives the organic solvent injection pump 22 so as to inject the organic solvent stored in the organic solvent storage tank 21 into the inside of the reactor 11 (S20). Then, it drives the organic solvent circulation pump 23 so as to circulate the organic solvent injected into the reactor 11 between the reactor 11 and the filter unit 60 and drives the rotating means 12 so as to rotate the waste catalysts inside the reactor 11, thereby cleaning the waste catalysts through the organic solvent inside the reactor 11 (S30). According to the present invention, preferably, the organic solvent injection pump 22 and the organic solvent circulation pump 23 may be the explosion-proof material due to the characteristic of the organic solvent used as the fuel. Also, the organic solvent is circulated between the reactor 11 and the filter unit 60 through the repetition of the step (S30), so that the organic solvent continuously filtered in the filter unit is injected into the reactor 11, thereby cleaning the waste catalyst with the organic solvent.

After the organic solvent cleaning is performed according to the driving of the rotating means and the organic solvent circulation pump 23, it drives the organic solvent circulation pump 23 so as to discharge the organic solvent existed in the inside of the reactor 11 (S40).

According to the present invention, the organic solvent discharged by the organic solvent circulation pump 23 is transferred to a solution separation unit (not shown) so as to be separated into the organic solvent and the impurity, and the organic solvent separated from the impurity is transferred to the organic solvent storage tank 21 to be reused.

After the completion of the organic solvent cleaning (S30), it drives the rotating means 12 so as to organic solvent-dehydrate the waste catalysts inside the reactor 11 and drives the heating jacket 13 for wrapping the outside surface of the reactor 11 and the drying unit 40 for injecting the hot air into the reactor 11 at a temperature of 70~110° C. so as to organic solvent-dry the waste catalysts inside the reactor 11 (S50). According to the present invention, the organic solvent steam, which is generated through the organic solvent drying in the step S50, is transferred to the condensation unit 50 from the reactor 11 and then, condensed by the operation of the condensation unit 50 to be reused. At this time, if necessary, the heating band 51 is driven, so that it can prevent the organic solvent steam, which is delivered from the reactor 11 to the condensation unit 50, from being condensed owing to the outside temperature.

Thereafter, it drives the organic acid injection pump 32 so as to inject the organic acid stored in the organic acid tank 31 into the inside of the reactor 11 (S60). After the organic acid stored in the organic acid tank 31 is injected into the inside of the reactor 11, it drives the heating jacket 13 so as to maintain the internal temperature of the reactor 11 at 40~50° C., drives the organic acid circulation pump 33 so as to circulate the organic acid injected into the reactor 11 between the reactor 11 and the filter unit 60, and drives the rotating means 12 so as to rotate the waste catalysts inside the reactor 11, thereby cleaning the waste catalysts through the organic acid inside the reactor 11 (S70).

After the completion of the organic acid cleaning according to the driving of the rotating means 12 and the organic acid circulation pump 33, it drives the organic acid circulation pump 33 so as to discharge the organic acid existed in the inside of the reactor 11 (S80). According to the present invention, preferably, the organic acid injection pump 32 and the organic acid circulation pump 33 may be the chemical pump due to the characteristic of the organic acid injected at a temperature of 40~50° C. Also, the organic acid is circulated between the reactor 11 and the filter unit 60 through the repetition of the step S70, so that the organic acid continuously filtered in the filter unit is injected into the reactor 11, thereby cleaning the waste catalyst with the organic acid.

According to the present invention, in the step S80, the organic acid discharged by the organic acid circulation pump 33 is cooled at a temperature of 0~29° C. to be crystallized and centrifuged in a centrifugal separator (not shown). Then, the organic acid centrifuged in the centrifugal separator is transferred to a sedimentation tank (not shown) to be deposited by means of the ammonia water. Continuously, it is solvent-separated through a solvent separation unit (not shown) and then, transferred to the organic acid storage tank 31 to be reused.

After the completion of the organic acid cleaning, it drives the rotating means 12 so as to organic acid-dehydrate the waste catalysts inside the reactor 11 and drives the heating jacket 13 and the drying unit 40 at a temperature of 70~90° C. so as to organic acid-dry the waste catalysts inside the reactor 11 (S90). Thereafter, the organic acid gas generated during the organic acid drying is discharged to the roasting furnace 70 to be gas-treated.

According to the present invention, the desulfurization waste catalyst produced in the residual hydro desulfurization (RHDS) and vacuum residue desulfurization (VRDS) processes can be organic solvent-cleaned and organic acid-cleaned in one reactor.

According to the present invention, the organic solvent steam generated in the organic solvent cleaning process is condensed to be reused and the gas generated in the organic acid cleaning process is discharged through the roasting furnace to be gas-treated.

According to the present invention, the organic solvent-cleaning and the organic acid-cleaning can be performed in one reaction unit, so that it can reduce the costs for installation thereby having an economic advantage.

Although the invention has been described according to the preferred embodiment mentioned above, the invention can be variously changed and modified without deviating from the essential point and scope of the invention. Accordingly, the accompanying Claims include such change and modification belonging to the essential point of the invention.

What is claimed is:

1. An integrated waste catalyst cleaning apparatus for residual hydro desulfurization and vacuum residue desulfurization processes comprising:

a reaction unit comprising a reactor for injecting waste catalysts used in the residual hydro desulfurization and vacuum residue desulfurization processes, a rotating means for rotating the waste catalysts injected into the reactor and formed inside the reactor, and a heating jacket for wrapping an outside surface of the reactor and applying a heat thereto;

an organic solvent unit comprising an organic solvent storage tank for storing an organic solvent therein and an organic solvent injection pump for injecting the organic solvent stored in the organic solvent storage tank into the reactor through a pumping;

an organic acid unit comprising an organic acid storage tank for storing an organic acid therein and an organic acid injection pump for injecting the organic acid stored in the organic acid storage tank into the reactor through a pumping;
a drying unit for applying a hot air to the reactor so as to dry the waste catalysts;
a condensation unit for condensing an organic solvent steam produced in the reactor so as to pick up the organic solvent;
a heating band for preventing the organic solvent steam from being condensed owing to an outside temperature when the organic solvent steam produced in the reaction unit is delivered to the condensation unit and
control valves formed at transfer paths for connecting the reaction unit, the organic solvent unit, the organic acid unit, the drying unit, and the condensation unit thereto to control an injection and a discharge of the organic solvent and the organic acid, wherein the apparatus has a structure to control the apparatus in the following order of that the waste catalyst is injected into the reactor, the organic solvent injection pump is driven to inject the organic solvent stored in the organic solvent storage tank into the inside of the reactor, the organic solvent circulation pump and the rotating means are driven to circulate the organic solvent injected into the reactor between the reactor and the filter unit and to rotate the waste catalysts inside the reactor, the organic solvent circulation pump is driven to discharge the organic solvent existed in the inside of the reactor, the rotating means is driven to organic solvent-dehydrate the waste catalysts inside the reactor, the heating jacket and the drying unit are driven for injecting the hot air into the reactor to organic solvent-dry the waste catalysts inside the reactor, the organic acid injection pump is driven to inject the organic acid stored in the organic acid tank into the inside of the reactor, the heating jacket is driven to maintain the internal temperature of the reactor at 40 to 50 ° C., the organic acid circulation pump is driven to circulate the organic acid injected into the reactor between the reactor and the filter unit, the rotating means is driven to rotate the waste catalysts inside the reactor, the organic acid circulation pump is driven to discharge the organic acid existed in the inside of the reactor, the rotating means is driven to organic acid-dehydrate the waste catalysts inside the reactor, and then the heating jacket and the drying unit are driven to organic acid-dry the waste catalysts inside the reactor.

2. The integrated waste catalyst cleaning apparatus as claimed in claim 1 further comprising:
a first filter for filtering a waste catalyst byproduct of the organic solvent between the organic solvent storage tank and the reactor; and
a second filter for filtering a waste catalyst byproduct of the organic acid between the organic acid storage tank and the reactor.

3. The integrated waste catalyst cleaning apparatus as claimed in claim 2, wherein the organic solvent unit further comprises an organic solvent circulation pump for circulating the organic solvent injected into the reaction unit between the reaction unit and the filter unit and the organic acid unit further comprises an organic acid circulation pump for circulating the organic acid injected into the reaction unit between the reaction unit and the filter unit.

4. An integrated cleaning method using the integrated waste catalyst cleaning apparatus for residual hydro desulfurization and vacuum residue desulfurization processes as claimed in claim 1, the method comprising:
injecting the waste catalyst into the reactor;
driving the organic solvent injection pump so as to inject the organic solvent stored in the organic solvent storage tank into the inside of the reactor;
driving the organic solvent circulation pump so as to circulate the organic solvent injected into the reactor between the reactor and the filter unit and driving the rotating means so as to rotate the waste catalysts inside the reactor, thereby cleaning the waste catalysts through the organic solvent inside the reactor;
driving the organic solvent circulation pump so as to discharge the organic solvent existed in the inside of the reactor;
driving the rotating means so as to organic solvent-dehydrate the waste catalysts inside the reactor and driving the heating jacket for wrapping the outside surface of the reactor and the drying unit for injecting the hot air into the reactor so as to organic solvent-dry the waste catalysts inside the reactor;
driving the organic acid injection pump so as to inject the organic acid stored in the organic acid tank into the inside of the reactor;
driving the heating jacket so as to maintain the internal temperature of the reactor at 40~50° C., driving the organic acid circulation pump so as to circulate the organic acid injected into the reactor between the reactor and the filter unit, and driving the rotating means so as to rotate the waste catalysts inside the reactor, thereby cleaning the waste catalysts through the organic acid inside the reactor;
driving the organic acid circulation pump so as to discharge the organic acid existed in the inside of the reactor; and
driving the rotating means so as to organic acid-dehydrate the waste catalysts inside the reactor and driving the heating jacket and the drying unit so as to organic acid-dry the waste catalysts inside the reactor,
wherein the integrated cleaning method further comprises, after cleaning the waste catalysts, driving the condensation unit to condense and reuse the organic solvent steam generated during the drying of the organic solvent.

5. An integrated cleaning method using the integrated waste catalyst cleaning apparatus for residual hydro desulfurization and vacuum residue desulfurization processes as claimed in claim 2, the method comprising:
injecting the waste catalyst into the reactor;
driving the organic solvent injection pump so as to inject the organic solvent stored in the organic solvent storage tank into the inside of the reactor;
driving the organic solvent circulation pump so as to circulate the organic solvent injected into the reactor between the reactor and the filter unit and driving the rotating means so as to rotate the waste catalysts inside the reactor, thereby cleaning the waste catalysts through the organic solvent inside the reactor;
driving the organic solvent circulation pump so as to discharge the organic solvent existed in the inside of the reactor;
driving the rotating means so as to organic solvent-dehydrate the waste catalysts inside the reactor and driving the heating jacket for wrapping the outside surface of the reactor and the drying unit for injecting the hot air into the reactor so as to organic solvent-dry the waste catalysts inside the reactor;

driving the organic acid injection pump so as to inject the organic acid stored in the organic acid tank into the inside of the reactor;

driving the heating jacket so as to maintain the internal temperature of the reactor at 40~50° C., driving the organic acid circulation pump so as to circulate the organic acid injected into the reactor between the reactor and the filter unit, and driving the rotating means so as to rotate the waste catalysts inside the reactor, thereby cleaning the waste catalysts through the organic acid inside the reactor;

driving the organic acid circulation pump so as to discharge the organic acid existed in the inside of the reactor; and driving the rotating means so as to organic acid-dehydrate the waste catalysts inside the reactor and driving the heating jacket and the drying unit so as to organic acid-dry the waste catalysts inside the reactor.

6. An integrated cleaning method using the integrated waste catalyst cleaning apparatus for residual hydro desulfurization and vacuum residue desulfurization processes as claimed in claim 3, the method comprising:

injecting the waste catalyst into the reactor;

driving the organic solvent injection pump so as to inject the organic solvent stored in the organic solvent storage tank into the inside of the reactor;

driving the organic solvent circulation pump so as to circulate the organic solvent injected into the reactor between the reactor and the filter unit and driving the rotating means so as to rotate the waste catalysts inside the reactor, thereby cleaning the waste catalysts through the organic solvent inside the reactor;

driving the organic solvent circulation pump so as to discharge the organic solvent existed in the inside of the reactor;

driving the rotating means so as to organic solvent-dehydrate the waste catalysts inside the reactor and driving the heating jacket for wrapping the outside surface of the reactor and the drying unit for injecting the hot air into the reactor so as to organic solvent-dry the waste catalysts inside the reactor;

driving the organic acid injection pump so as to inject the organic acid stored in the organic acid tank into the inside of the reactor;

driving the heating jacket so as to maintain the internal temperature of the reactor at 40~50° C., driving the organic acid circulation pump so as to circulate the organic acid injected into the reactor between the reactor and the filter unit, and driving the rotating means so as to rotate the waste catalysts inside the reactor, thereby cleaning the waste catalysts through the organic acid inside the reactor;

driving the organic acid circulation pump so as to discharge the organic acid existed in the inside of the reactor; and driving the rotating means so as to organic acid-dehydrate the waste catalysts inside the reactor and driving the heating jacket and the drying unit so as to organic acid-dry the waste catalysts inside the reactor.

7. An integrated cleaning method using the integrated waste catalyst cleaning apparatus for residual hydro desulfurization and vacuum residue desulfurization processes as claimed in claim 1, the method comprising:

injecting the waste catalyst into the reactor;

driving the organic solvent injection pump so as to inject the organic solvent stored in the organic solvent storage tank into the inside of the reactor;

driving the organic solvent circulation pump so as to circulate the organic solvent injected into the reactor between the reactor and the filter unit and driving the rotating means so as to rotate the waste catalysts inside the reactor, thereby cleaning the waste catalysts through the organic solvent inside the reactor;

driving the organic solvent circulation pump so as to discharge the organic solvent existed in the inside of the reactor;

driving the rotating means so as to organic solvent-dehydrate the waste catalysts inside the reactor and driving the heating jacket for wrapping the outside surface of the reactor and the drying unit for injecting the hot air into the reactor so as to organic solvent-dry the waste catalysts inside the reactor;

driving the organic acid injection pump so as to inject the organic acid stored in the organic acid tank into the inside of the reactor;

driving the heating jacket so as to maintain the internal temperature of the reactor at 40~50° C., driving the organic acid circulation pump so as to circulate the organic acid injected into the reactor between the reactor and the filter unit, and driving the rotating means so as to rotate the waste catalysts inside the reactor, thereby cleaning the waste catalysts through the organic acid inside the reactor;

driving the organic acid circulation pump so as to discharge the organic acid existed in the inside of the reactor; and driving the rotating means so as to organic acid-dehydrate the waste catalysts inside the reactor and driving the heating jacket and the drying unit so as to organic acid-dry the waste catalysts inside the reactor.

8. The integrated waste catalyst cleaning apparatus as claimed in claim 1, wherein the organic solvent storage tank is connected to the condensation unit to receive an organic solvent produced by condensing the organic solvent steam in the condensation unit.

\* \* \* \* \*